(12) United States Patent
Nakamura et al.

(10) Patent No.: US 8,092,869 B2
(45) Date of Patent: Jan. 10, 2012

(54) INK COMPOSITION FOR INK JET RECORDING AND METHOD FOR INK JET RECORDING

(75) Inventors: Ippei Nakamura, Ashigarakami-gun (JP); Yuuichi Hayata, Ashigarakami-gun (JP)

(73) Assignee: Fujifilm Corporation, Tokyo (JP)

( * ) Notice: Subject to any disclaimer, the term of this patent is extended or adjusted under 35 U.S.C. 154(b) by 695 days.

(21) Appl. No.: 12/210,722

(22) Filed: Sep. 15, 2008

(65) Prior Publication Data

US 2009/0074982 A1   Mar. 19, 2009

(30) Foreign Application Priority Data

Sep. 18, 2007 (JP) ................. 2007-240773

(51) Int. Cl.
C08J 7/04 (2006.01)
C08J 7/00 (2006.01)

(52) U.S. Cl. ........ 427/511; 427/508; 427/487; 427/457; 522/6; 522/12; 522/14; 522/21; 522/27

(58) Field of Classification Search .................. 427/511, 427/508, 487, 457; 522/6, 12, 14, 21, 27
See application file for complete search history.

(56) References Cited

U.S. PATENT DOCUMENTS

| 4,134,813 A | 1/1979 | Kuesters et al. |
| 5,239,028 A | 8/1993 | Nakagawa et al. |
| 2003/0083396 A1 | 5/2003 | Yitalo et al. |
| 2006/0025498 A1 | 2/2006 | Fukushige et al. |
| 2008/0008966 A1 | 1/2008 | Hayata et al. |
| 2008/0131618 A1 | 6/2008 | Nakamura et al. |
| 2009/0186163 A1 | 7/2009 | Umebayashi et al. |

FOREIGN PATENT DOCUMENTS

| DE | 10054550 A1 | 5/2001 |
| EP | 1829680 A1 | 9/2007 |
| EP | 1876209 A1 | 1/2008 |
| EP | 1882724 A1 | 1/2008 |
| EP | 1927477 A1 | 6/2008 |
| EP | 1944173 A1 | 7/2008 |
| EP | 1958994 A1 | 8/2008 |
| JP | 3122172 A | 5/1991 |
| JP | 03122172 A * | 5/1991 |
| JP | 05-214280 A | 8/1993 |
| JP | 6308727 A | 11/1994 |
| JP | 08-041133 A | 2/1996 |
| JP | 08041133 A | 2/1996 |
| JP | 3112771 B2 | 9/2000 |
| JP | 2001 525479 A | 12/2001 |
| JP | 2002241647 A | 8/2002 |
| JP | 2004-514014 A | 5/2004 |
| JP | 2004514014 A | 5/2004 |
| JP | 2004 238456 A | 8/2004 |
| JP | 2005 112895 A | 4/2005 |
| JP | 2007231082 A | 9/2007 |
| WO | 9929787 A3 | 6/1999 |
| WO | 02/38688 A2 | 5/2002 |
| WO | 0238688 A2 | 5/2002 |

OTHER PUBLICATIONS

European Search Report dated Apr. 2, 2009 for EP Application No. 09000567.9.

* cited by examiner

*Primary Examiner* — Timothy J. Kugel

(74) *Attorney, Agent, or Firm* — Sughrue Mion, PLLC

(57) ABSTRACT

There is provided an ink composition for ink jet recording, including (A) N-vinyllactam, (B) a compound having a partial structure represented by the following formula (I) and a polymerizable unsaturated bond, and (C) a radical polymerization initiator. In formula (I), $R^1$ represents a hydrogen atom or an alkyl group, and $R^2$ to $R^5$ each independently represent a methyl group or an ethyl group.

(I)

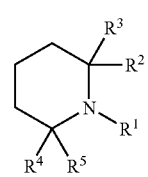

9 Claims, No Drawings

INK COMPOSITION FOR INK JET RECORDING AND METHOD FOR INK JET RECORDING

CROSS-REFERENCE TO RELATED APPLICATION

This application claims priority under 35 USC 119 from Japanese Patent Application No. 2007-240773, the disclosure of which is incorporated by reference herein.

BACKGROUND OF THE INVENTION

1. Field of the Invention

The present invention relates to an ink composition used for ink jet recording, and a method for ink jet recording using the ink composition.

2. Description of the Related Art

Examples of an image recording method for forming an image on a recording medium such as a paper based on an image data signal include an electrophotographic method, a sublimation thermal transfer method, a melting thermal transfer method, and an ink jet method. The electrophotographic method requires a process of forming an electrostatic latent image on a photoreceptor drum by charging and light exposure, which makes the system complicated, and as a result, there is the problem such that production costs are high. In the thermal transfer system, although an apparatus is inexpensive, because an ink ribbon is used, there are problems such as high running costs and the generation of waste materials.

On the other hand, in the ink jet method, not only is an apparatus inexpensive, but in the ink jet method, since an image is formed directly on a recording medium by ejecting an ink only onto an area necessary for an image, ink can be used efficiently, and running costs are low. Additionally, the inkjet system generates less noise, and is therefore excellent as an image recording system.

As an ink composition cured by irradiation with actinic radiation such as ultraviolet rays (a radiation-curable ink composition) and usable as an ink composition for ink jet recording, an ink composition that is cured with high sensitivity and that can form high quality images is required.

When high sensitivity is achieved in a radiation-curable ink, high curability with respect to the irradiation with actinic radiation is also obtained. This provides various advantages, such as inhibition of volatilization of uncured low molecular weight substances, inhibition of a decrease in strength of an image formed, and the like, in addition to the advantages of an increased life span of equipment due to lower power consumption, a lower burden on an actinic radiation generator, and the like. Furthermore, the improvement in strength of a cured coating film due to high sensitivity of a radiation-curable ink composition provides high strength and durability to an image area formed by the ink composition.

An ink composition in which a combination of monomers having different functional groups selected from monofunctional monomers or polyfunctional monomers is used, has been proposed as an ultraviolet-curable ink composition (for example, see Japanese Patent Application Laid-Open (JP-A) No. 5-214280). Furthermore, a composition containing a polyfunctional acrylate has been proposed as a radiation-curable composition (for example, see JP-A No. 8-41133). These ink compositions have an excellent curing rate and enable the formation of a image free from bleeding. However, in these ink composition, since a polyfunctional acrylate is used as a main component of a curable composition, the flexibility of the cured product deteriorates, and due to volume contraction at the time of curing, adhesiveness (adhesion) to a recording medium also deteriorates.

Regarding adhesiveness of an ultraviolet-curable ink composition to a recording medium, a radiation-curable ink jet ink composition in which N-vinyllactam is used as a component for accelerating adhesiveness to a recording medium and flexibility of the cured product has been disclosed (for example, see JP-A No. 2004-514014). However, when N-vinyllactam represented by N-vinylcaprolactam is used, tackiness and leaching after curing may occur due to low copolymerizability with widely used radical-polymerizable monomers such as an acrylate, and additionally, the storage stability of an ink may deteriorate due to N-vinyllactam.

Thus, an ink composition usable in an ink jet apparatus and having excellent adhesiveness to a recording medium, excellent curing sensitivity, and excellent ejection stability, while maintaining image strength is desired; however, such an ink composition has not conventionally been available.

SUMMARY OF THE INVENTION

The present invention has been made in view of the above circumstances, and provides an ink composition for ink jet recording.

Further, the present invention provides a method for ink jet recording using the ink composition.

According to an aspect of the invention, there is provided an ink composition for ink jet recording, the ink composition including (A) a N-vinyllactam, (B) a compound having a partial structure represented by the following formula (I) and a polymerizable unsaturated bond, and (C) a radical polymerization initiator.

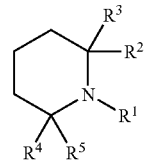

In formula (I), $R^1$ represents a hydrogen atom or an alkyl group, and $R^2$ to $R^5$ each independently represent a methyl group or an ethyl group.

According to another aspect of the invention, there is provided a method for ink jet recording, the method including:

(i-1) ejecting the ink composition for ink jet recording of an aspect of the invention onto a recording medium, and (i-2) curing the ejected ink composition for ink jet recording by irradiation with actinic radiation.

DETAILED DESCRIPTION OF THE INVENTION

[Ink Composition for Ink Jet Recording]

The ink composition for ink jet recording of the present invention (hereinafter sometimes referred to as an "ink composition" for simplicity) includes (A) a N-vinyllactam, (B) a compound having a partial structure represented by formula (I) as described above and a polymerizable unsaturated bond in the molecule, and (C) a radical polymerization initiator.

The components in the ink composition for ink jet recording of the invention will be described below.

<(A) N-Vinyllactam>

An N-vinyllactam (A) will be described in detail below.

Any N-vinyllactam (A) may be used as the N-vinyllactam in the invention so long as it is a N-vinyllactam that includes a lactam ring having a structure in which carboxyl group and an amino group are dehydrocondensed to form a ring, and a vinyl group directly bonded to a nitrogen atom contained in the ring.

The N-vinyllactam (A) in the invention is not particularly limited so long as it is a compound having a structure in which a vinyl group is directly bonded to a nitrogen atom of the lactam ring. From the standpoints of stability of a compound, solubility in an ink composition, availability and the like, the number of carbon atoms contained in the ring is preferably from 3 to 5, more preferably 3 or 5, and still more preferably 5.

From the standpoints of availability, safety and the like, the number of members of a lactam ring of N-vinyllactam is preferably from 5 to 7, more preferably 5 or 7, and still more preferably 7 which is an epsilon-caprolactam ring.

A N-vinyllactam having plural vinyl groups as substituents may be used as the N-vinyllactam. The number of vinyl groups including a vinyl group directly bonded to the nitrogen atom is preferably from 1 to 2. The substitution position of vinyl group other than the vinyl group directly bonded to the nitrogen atom is preferably a position on a carbon atom contained in the lactam ring.

The N-vinyllactam (A) in the invention may have other substituents. Examples of the substituent which may be introduced include an alkyl group, a halogen atom and a hydroxyl group. An alkyl group having about 1 to 4 carbon atoms is preferred, and a methyl group is more preferred.

The substitution position of such a substituent is preferably a position on a carbon atom contained in the lactam ring. In an embodiment, a N-vinyllactam which does not have a substituent may be preferably used.

Specifically, the N-vinyllactam is more preferably N-vinylpyrrolidone, which is a five-membered ring, or N-vinylcaprolactam, which is a seven-membered ring, and still more preferably a N-vinylcaprolactam, which is a seven-membered ring.

The N-vinyllactam (A) can be produced by the conventional synthesis methods as described in, for example, Bulletin of the Chemical Society of Japan, Vol. 43, 7, pages 2208-2213 (1970), Japanese Patent Application Publication (JP-B) No. 49-20583 and JP-A No. 11-60558.

Furthermore, the N-vinyllactam (A) is available as commercial products, for example V-CAP, manufactured by ISP (Japan) Ltd.; vinylcaprolactam, manufactured by BASF; V-PYROL, manufactured by ISP (Japan) Ltd.; and the like.

The content of the N-vinyllactam (A) in the ink composition of the invention is preferably in the range of from 5 to 35% by mass, more preferably in the range of from 10 to 30% by mass, and still more preferably in the range of from 12 to 26% by mass, based on the mass of the whole ink composition from the standpoints of curing rate, adhesion of a cured film to a recording medium and properties of a film after curing.

The N-vinyllactam (A) may be used alone or as mixtures of two kinds or more thereof.

<Compound Having a Structure Represented by Formula (I) and Polymerizable Unsaturated Bond>

The ink composition for ink jet recording of the invention contains a compound (B) having a structure represented by the following formula (I) and a polymerizable unsaturated bond (hereinafter sometimes referred to as a "specific polymerizable compound (B)").

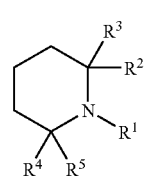

(I)

In formula (I), $R^1$ represents a hydrogen atom or an alkyl group, and $R^2$ to $R^5$ each independently represent a methyl group or an ethyl group.

As the specific polymerizable compound (B) that can be used in the invention, any compound may be used so long as it is a compound having a partial structure represented by the following formula (I) and a polymerizable double bond in the molecule.

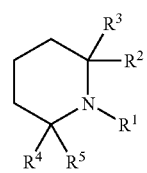

(I)

In formula (I), $R^1$ represents hydrogen atom or an alkyl group. The alkyl group may have a substituent.

$R^1$ represents a hydrogen atom or an alkyl group having one or more carbon atoms. An alkyl group having from 1 to 20 carbon atoms is preferred, and an alkyl group having from 1 to 12 carbon atoms is more preferred.

More specifically, examples of the preferred alkyl group include a methyl group, an ethyl group, an n-butyl group, an n-hexyl group and an n-nonyl group. It is preferable that the carbon atom adjacent to the nitrogen atom has hydrogen atom(s), and the number of hydrogen atom on the carbon atom adjacent to the nitrogen atom is preferably 2 or more.

When $R^1$ is a substituted alkyl group, examples of the substituent that can be introduced include an alkyl group, an alkoxy group, an aryl group, an aryloxy group, an acyl group, an amino group, a hydroxyl group, a cyano group, a nitro group and a halogen atom.

$R^2$ to $R^5$ each independently represent a methyl group or an ethyl group, and methyl group is preferred. More preferably all of $R^2$ to $R^5$ are methyl group.

In the specific polymerizable compound (B) of the invention, the partial structure represented by the above formula (I) is connected to a polymerizable double bond via a connecting group. Regarding the position to be connected to a polymerizable double bond, any one of positions excluding the positions having $R^2$ to $R^5$ thereon in the six-membered ring in formula (I) may be connected to a polymerizable double bond. Above all, the polymerizable double bond is preferably bonded to an alkyl group (including substituted alkyl group) represented by $R^1$, or to a position (*) shown below, and is more preferably bonded to the position (*).

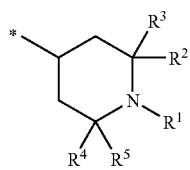

When the partial structure represented by formula (I) is connected to the polymerizable double bond, the connecting group is a divalent connecting group, and examples thereof include an oxygen atom, an arylene group, and an alkylene group in which a hydrogen atom is eliminated from an alkyl group (the alkyl group has the same meaning as defined for the alkyl group for $R^1$). The connecting group is more preferably an alkylene group having from 2 to 6 carbon atoms, and is still more preferably an alkylene group having from 2 to 4 carbon atoms. Further, the alkylene group may have one or more divalent groups selected from the group consisting from —CO—, —O—, —S— and —NR$^7$— in a methylene chain comprising at least one methylene group (—CH$_2$—). Such divalent group(s) selected from the group consisting of —CO—, —O—, —S— and —NR$^7$— may be present between methylene groups of the methylene chain or at the end(s) of the methylene chain. $R^7$ is an alkyl group, and the meaning and preferred range thereof are the same as those described for the alkyl group of $R^1$.

The polymerizable double bond connected via a connecting group is preferably a radical-polymerizable double bond. The number of the polymerizable double bond present in the specific polymerizable compound (B), that is, connected to the partial structure is preferably from 1 to 3, more preferably 1 to 2, and particularly preferably 1, from the standpoints that a low viscosity composition suitable as an ink for ink jet recording is formed and a flexible cured film can be obtained.

Examples of preferable functional group containing a polymerizable double bond include (meth)acryloyl group, allyl group, styryl group and vinyloxy group. (Meth)acryloyl group is more preferred from the standpoint of curing sensitivity of an ink composition.

More specifically, the specific polymerizable compound (B) is preferably a compound having a polymerizable double bond, as represented by the following formula (II).

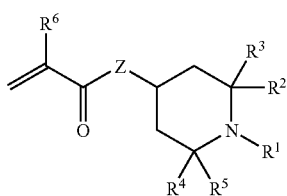

In formula (II), $R^1$ to $R^5$ are the same as those in formula (I), and the preferred ranges thereof are also the same as those described for $R^1$ to $R^5$ in formula (I) respectively.

$R^6$ represents a methyl group or a hydrogen atom, and $R^6$ is preferably a hydrogen atom.

Z represents a divalent connecting group. Z is preferably an oxygen atom or an alkylene group in which a hydrogen atom is eliminated from an alkyl group (the alkyl group has the same meaning as defined for the alkyl group for $R^1$), and is more preferably an alkylene group having from 1 to 20 carbon atoms. The alkylene group may have one or more divalent groups selected from the group consisting of —CO—, —O—, —S— and —NR$^7$— in a methylene chain comprising at least one methylene group (—CH$_2$—). Such divalent group(s) selected from the group consisting of —CO—, —O—, —S— and —NR$^7$— may be present between methylene groups of the methylene chain or at the end(s) of the methylene chain. In an embodiment, Z is preferably an alkylene group having an ether bond (—O—) in an alkylene chain comprising one or more methylene groups. In an embodiment, Z is more preferably a group having an ether bond (—O—) at the both ends of an alkylene group. $R^7$ is an alkyl group, and the meaning and the preferred range thereof is the same as those described for the alkyl group of $R^1$.

Specifically, the alkylene group represented by Z is preferably an alkylene group having from about 3 to 12 carbon atoms, and specific examples thereof include a propylene group, a butylene group, an octylene group and a nonylene group. Those alkylene groups may have one or more divalent groups selected from the group consisting of —CO—, —O—, —S— and —NR$^7$— in a chain structure comprising one or more methylene group. Such divalent group(s) selected from the group consisting of —CO—, —O—, —S— and —NR$^7$— may be present between methylene groups of the methylene chain or at the end(s) of the methylene chain. Furthermore, the divalent connecting group may be a divalent connecting group configured by a combination of two kinds or more thereof.

Specific examples of the specific polymerizable compound (B) (exemplified compounds (B-1) to (B-21)) that can preferably be used in the invention are shown below, but the invention is not construed as being limited thereto. When a steric isomer is present in each exemplified compound, any one of those may be used, and a mixture of steric isomers may be used.

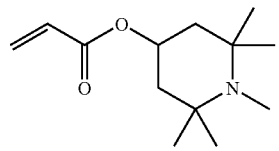
(B-1)

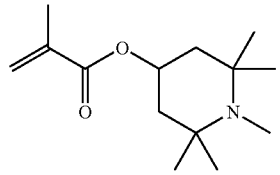
(B-2)

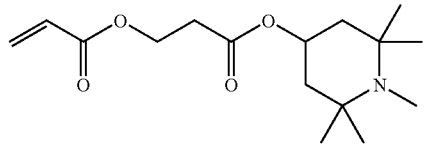
(B-3)

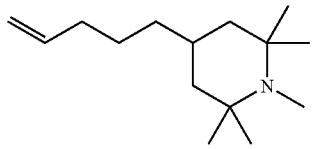
(B-4)

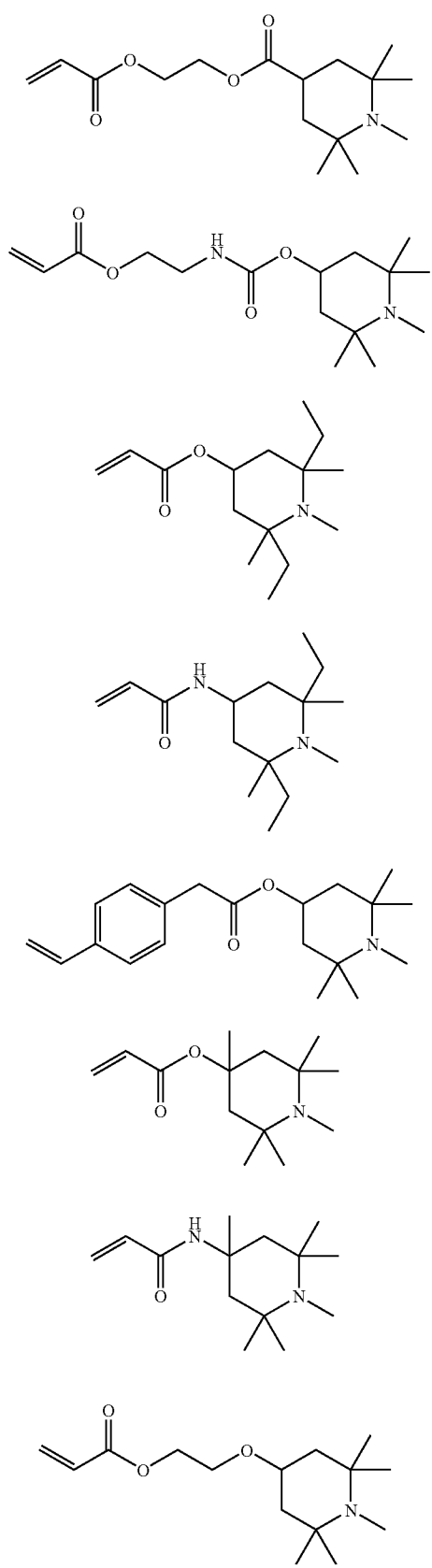
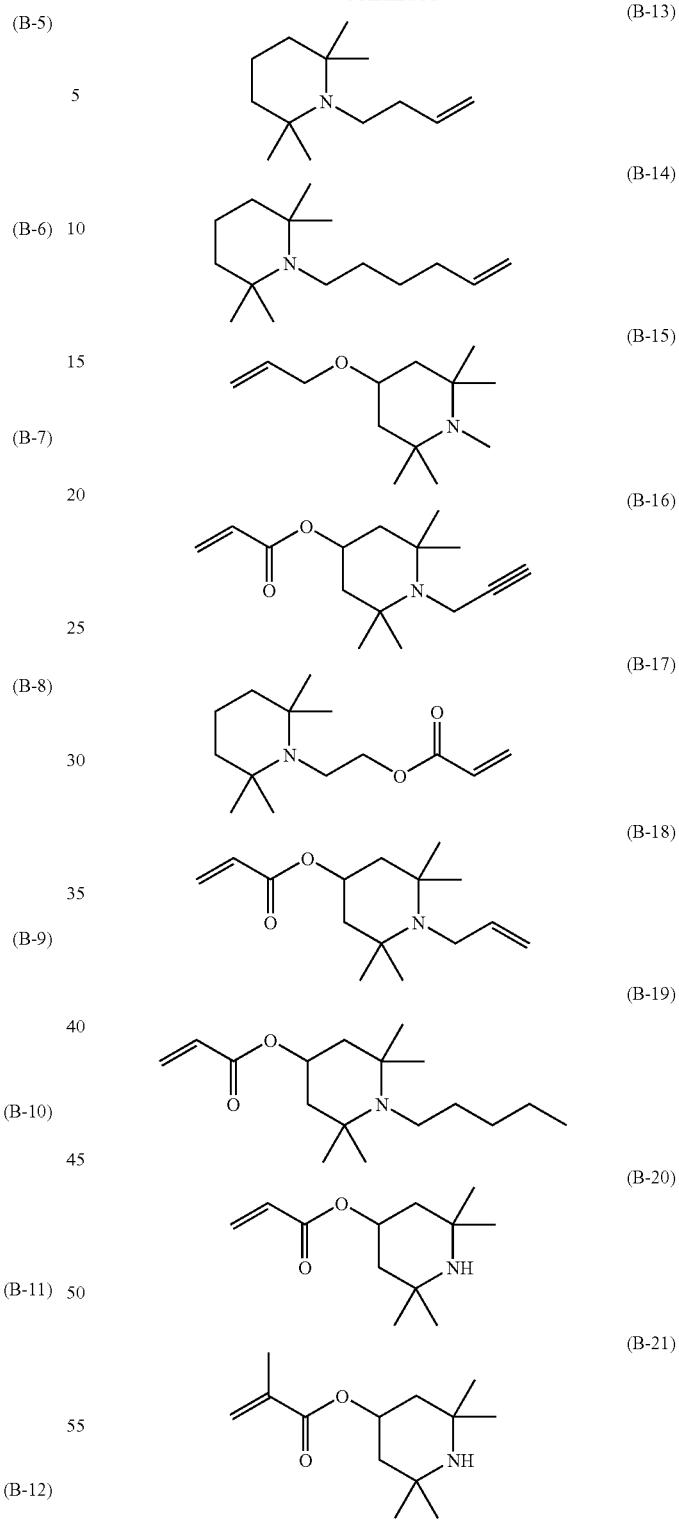
Of those, (B-1), (B-2), (B-3), (B-12) and the like that have (meth)acryloyl group in the molecule are preferred, (B-1) and (B-2) are more preferred, and (B-1) is particularly preferred.
The specific polymerizable compound (B) can be produced by the conventional synthesis methods, such as those described in, for example, Makromolekulare Chemie, vol. 181, No. 3, pages 595-634 (1980); Journal of Applied Polymer Science, vol. 69, No. 13, pages 2649-2656 (1998); Journal of Applied Polymer Science, vol. 75, 9, pages 1103-1114 (2000); Polymers for Advanced Technologies, vol. 13, pages 247-253 (2002); and JP-A No. 3-251569, and can be available as commercial products such as FANCRYL FA-711MM and FA-711HM (manufactured by Hitachi Chemical Co., Ltd.).

The specific polymerizable compound (B) may be used alone or as mixtures of two kinds or more thereof in the ink composition of the invention.

The content of the specific polymerizable compound (B) in the ink composition of the invention is preferably in the range of from 1 to 30% by mass, more preferably in the range of from 2 to 26% by mass, and still more preferably from 2 to 20% by mass, based on the mass of the whole ink composition for ink jet recording from the standpoints of balance between curing rate and adhesiveness to a substrate, flexibility after curing, stability of an ink composition and inkjet suitability. When the content of the specific polymerizable compound (B) is fallen within the above range, curing rate, sensitivity and ink composition stability may be improved, and more desirable coating film properties may be obtained.

<(C) Radical Polymerization Initiator>

The ink composition for ink jet recording of the invention contains a radical polymerization initiator.

The radial polymerization initiator may be appropriately selected from conventional polymerization initiators depending on the kind of a polymerizable compound used and the use purpose of an ink composition.

The radical polymerization initiator used in the ink composition of the invention is a compound that absorbs external energy to generate polymerization initiation species. External energy used to initiate polymerization is largely classified into heat and radiation. When heat is used as the external energy, a thermal polymerization initiator is used, and when light is used as the external energy, a photopolymerization initiator is used. Examples of the radiation include γ-ray, β-ray, electron beam, ultraviolet light, visible light and infrared light.

As the thermal polymerization initiator, a conventional thermal polymerization initiator may be used and as the photopolymerization initiator, a conventional photopolymerization initiator can be used.

Examples of the preferable radial polymerization initiator that can be used in the invention include (a) aromatic ketones, (b) acylphosphine oxide compounds, (c) aromatic onium salt compounds, (d) organic peroxides, (e) thio compounds, (f) hexaarylbiimidazole compounds, (g) ketoxime ester compounds, (h) borate compounds, (i) adinium compounds, (j) metallocene compounds, (k) active ester compounds, (l) compounds having carbon-halogen bond, and (m) alkyl amine compounds.

In the invention, the radial polymerization initiator may be used alone or as mixtures thereof. It is preferred to use two kinds or more of radial polymerization initiators in combination from the standpoint of the effect.

Specific examples of the radical polymerization initiator used in the invention include benzoin isobutyl ether, 2,4-diethyl thioxanthone, 2-isopropyl thioxanthone, benzyl, 2,4,6-trimethylbenzoyldiphenyl phosphine oxide, 2-benzyl-2-dimethylamino-1-(4-morphorinophenyl)-butane-1-one, bis(2,4,6-dimethoxybenzoyl)-2,4,4-trimethylpentyl phosphine oxide, 1,2-octanedione and 1-(4-(phenylthio)-2,2-(O-benzoyloxime)). Other than these radical polymerization initiators, the polymerization initiator may be used together with a molecule cleavage type compound, and example thereof include 1-Hydroxycyclohexylphenyl ketone, benzoin ethyl ether, benzyl dimethyl ketal, 2-hydroxy-2-methyl-1-phenyl-propane-1-one, 1-(4-isopropylphenyl)-2-hydroxy-2-methylpropane-1-one and 2-methyl-1-(4-methylthiophenyl)-2-morpholinopropane-1-one. Furthermore, the radical polymerization initiator may be used together with a hydrogen abstraction type photopolymerization initiator, and examples thereof include benzophenone, 4-phenylbenzophenone, isophthalphenone, 4-benzoyl-4'-methyl-diphenylsulfide and the like.

The radical polymerization reaction in the invention is used preferably in the range of from 1 to 50% by mass, more preferably in the range of from 2 to 40% by mass, and still more preferably from 5 to 35% by mass, based on the total mass of the N-vinyllactam (A), the specific polymerizable compound (B) and a colorant described hereinafter, or based on the total mass of the N-vinyllactam (A), the specific polymerizable compound (B), a polymerizable compound described hereinafter, and the colorant when the N-vinyllactam (A), the specific polymerizable compound (B), the polymerizable compound, and the colorant are used.

The radical polymerization initiator may be contained in the range of from 200:1 to 1:200, preferably from 50:1 to 1:50, and more preferably from 20:1 to 1:5, in terms of mass ratio of polymerization initiator:sensitizing dye, to the sensitizing dye described hereinafter that can be used according to need.

In addition to the above-described components, the ink composition for ink jet recording of the invention may include other components for the purpose of improving properties and the like so long as the advantage of the invention is not impaired.

Those optional components will be described below.

<Colorant>

It is possible to form a color image by using the ink composition for ink jet recording of the invention, since the ink composition contains a colorant.

While the colorant to be used in the composition of the invention is not particularly limited, the colorant may be arbitrarily selected from known colorants such as pigments, oil-soluble dyes, water-soluble dyes, or disperse dyes. Among them, pigments and oil-soluble dyes are preferable due to their resistance against weathering as well as color reproducability, and pigments are more preferable.

It is preferable that the colorant used in the ink composition according to the invention does not function as a polymerization inhibitor in the polymerization reaction, which is the curing reaction, so that the curing reaction with actinic rays is not inhibited.

—Pigment—

The pigment for use in the invention is not particularly limited, and examples thereof include organic or inorganic pigments having the following Color Index numbers:

As for red and magenta pigments, the pigment may be Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, or 257, Pigment Violet 3, 19, 23, 29, 30, 37, 50, or 88, or Pigment Orange 13, 16, 20, or 36.

As for blue and cyan pigments, the pigment may be Pigment Blue 1, 15, 15:1, 15:2, 15:3, 15:4, 15:6, 16, 17-1, 22, 27, 28, 29, 36, or 60.

As for green pigments, the pigment may be Pigment Green 7, 26, 36, or 50.

As for yellow pigments, the pigment may be Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, or 193.

As for black pigments, the pigment may be Pigment Black 7, 28, or 26.

As for white pigments, the pigment may be Pigment White 6, 18, or 21.

The pigments may be selected and used depending on the application of the ink composition.

—Oil-Soluble Dye—

Hereinafter, the oil-soluble dye for use in the invention will be described.

The oil-soluble dye for use in the invention is a dye that is substantially insoluble in water. Specifically, the oil-soluble dye has solubility in water at 25° C. (the mass of the dye soluble in 100 g of water) of 1 g or less, preferably 0.5 g or less, and more preferably 0.1 g or less. Thus, the oil-soluble dye means a so-called water-insoluble pigment or an oil-soluble colorant, and among them, an oil-soluble colorant is preferable.

When the oil-soluble dye used in the present invention is a yellow dye, the yellow dye is not particularly limited. Examples thereof include: aryl- or heteryl-azo dyes having a coupling component such as a phenol, a naphthol, an aniline, a pyrazolone, a pyridone, or an open-chain active methylene compound; azomethine dyes having a coupling component such as an open-chain active methylene compound; methine dyes such as benzylidene dyes and monomethine oxonol dyes; quinone dyes such as naphthoquinone dyes and anthraquinone dyes; as well as quinophtharone.

When the oil-soluble dye used in the present invention is a magenta dye, the magenta dye is not particularly limited. Examples thereof include: aryl- or heteryl-azo dyes having a coupling component such as a phenol, a naphthol, or an aniline; azomethine dyes having a coupling component such as a pyrazolone or a pyrazolotriazole; methine dyes such as arylidene dyes, styryl dyes, merocyanine dyes, and oxonol dyes; carbonium dyes such as diphenylmethane dyes, triphenylmethane dyes, and xanthene dyes; quinone dyes such as naphthoquinones, anthraquinones, and anthrapyridones; and fused polycyclic dyes such as dioxazine dyes.

When the oil-soluble dye used in the present invention is a cyan dye, the cyan dye is not particularly limited. Examples thereof include azomethine dyes such as indoaniline dyes, indophenol dyes, and dyes having a pyrrolotriazole as the coupling component; polymethine dyes such as cyanine dyes, oxonol dyes, and merocyanine dyes; carbonium dyes such as diphenylmethane dyes, triphenylmethane dyes, and xanthene dyes; phthalocyanine dyes; anthraquinone dyes; aryl- or heteryl-azo dyes having a coupling component such as a phenol, a naphthol, or an aniline; and indigo thioindigo dyes.

The dye may be a dye that forms a color (yellow, magenta, or cyan) only after the dissociation of a part of its chromophore. At dissociation, the counter cation may be an inorganic cation such as an alkali metal or ammonium, or an organic cation such as a pyridinium or a quaternary ammonium salt; or a polymeric cation having, as a partial structure, a cation selected from those described above.

Preferable typical examples thereof include, but are not limited to: C.I. Solvent Black 3, 7, 27, 29 and 34; C.I. Solvent Yellow 14, 16, 19, 29, 30, 56, 82, 93 and 162; C.I. Solvent Red 1, 3, 8, 18, 24, 27, 43, 49, 51, 72, 73, 109, 122, 132 and 218; C.I. Solvent Violet 3; C.I. Solvent Blue 2, 11, 25, 35, 38, 67 and 70; C.I. Solvent Green 3 and 7; and C.I. Solvent Orange 2.

Particularly preferable among them are NUBIAN BLACK PC-0850, OIL BLACK HBB, OIL YELLOW 129, OIL YELLOW 105, OIL PINK 112, OIL RED 5B, OIL SCARLET 308, VALI FAST BLUE 2606, and OIL BLUE BOS (trade names, manufactured by Orient Chemical Industries); AIZEN SPILON BLUE GNH (trade names, manufactured by Hodogaya Chemical Co., Ltd.); NEOPEN YELLOW 075, NEOPEN MAZENTA SE1378, NEOPEN BLUE 808, NEOPEN BLUE FF4012, and NEOPEN CYAN FF4238 (trade names, manufactured by BASF).

—Disperse Dye—

In the invention, a disperse dye may also be additionally used in such a range of an amount that the disperse dye is soluble in a water-immiscible organic solvent. In general, the disperse dyes include water-soluble dye. In the present invention, it is preferably that the disperse dye be used in such a range of an amount that the disperse dye is soluble in a water-immiscible organic solvent.

Preferable specific examples thereof include C.I. Disperse Yellow 5, 42, 54, 64, 79, 82, 83, 93, 99, 100, 119, 122, 124, 126, 160, 184:1, 186, 198, 199, 201, 204, 224 and 237; C.I. Disperse Orange 13, 29, 31:1, 33, 49, 54, 55, 66, 73, 118, 119 and 163; C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; and C.I. Disperse Green 6:1 and 9.

After addition to the ink composition or the ink composition for ink jet recording according to the invention, the colorant for use in the invention is preferably dispersed in the ink to a suitable degree. Various dispersing machines, such as ball mills, sand mills, attriters, roll mills, agitators, HENSCHEL mixers, colloid mills, ultrasonic wave homogenizers, pearl mills, wet jet mills, or paint shakers, may be used for dispersion of the colorant.

In an embodiment, a dispersant is added at dispersing the colorant. The dispersant is not particularly limited, and is preferably a polymer dispersant. The polymer dispersant may be selected, for example from SOLSPERSE series products manufactured by Zeneca. A synergist suitable for the pigment may be used as a dispersion aid. In the present invention, the dispersant and the dispersion aid are added preferably in an amount of 1 to 50 parts by mass with respect to 100 parts by mass of the colorant.

The colorant may be directly added to the inkjet composition together with other components. Alternatively, the colorant may be, in advance, added and uniformly dispersed to or dissolved in a solvent or a dispersing medium such as a specific polymerizable compound (B) used in the invention or the other additional polymerizable compound which is used if desired, so as to improve the dispersibility.

In the invention, the colorant is preferably compounded by being added to one or a mixture of two or more of the specific polymerizable compound(s) (B) in advance in view of the prevention of the occurrence of problems such as the deterioration in solvent resistance caused by the remaining solvent in the cured image and VOCs (volatile organic compounds) caused by the residual solvent.

The polymerizable compound to be used is preferably a monomer with a low viscosity, from the point of dispersion efficiency only.

These colorants may be suitably selected and used singly or in combination of two or more thereof depending on a utilization purpose of the ink composition.

When a colorant which exists in a form of a solid material is used in the ink composition for ink jet recording in the invention, the average diameter of the particles of the colorant is preferably set in the range of 0.005 to 0.5 µm, more preferably in the range of 0.01 to 0.45 µm, and still more preferably in the range of 0.015 to 0.4 µm by selection of the colorant, the dispersant, the dispersion medium, the dispersing conditions, and the filtration conditions. By controlling the particle diameter, it becomes possible to prevent clogging in head nozzles and to maintain favorable storage stability, transparency, and curing efficiency of the inkjet composition.

While the content of colorant in the ink composition for ink jet recording is appropriately selected in accordance with utilization purposes, in consideration of physical properties and coloring property, the content of colorant in the ink composition is generally preferably from 0.5 to 10% by mass, more preferably from 1 to 8% by mass, based on the entire mass of the ink composition.

When the ink composition for ink jet recording according to the invention is a white ink composition in which a white pigment such as titanium oxide is used as a colorant, in order to insure hiding property, the content of colorant in the ink composition for ink jet recording is preferably from 5 to 30% by mass, more preferably from 10 to 25% by mass, based on the entire mass of the ink composition.

<Additional Polymerizable Compounds>

In addition to (B) the specific polymerizable compound, the ink composition according to the invention may further contain an additional polymerizable compound which is other than the specific polymerizable compound or the specific monomer. Examples of such additional compound that can be used in combination with the specific polymerizable compound include a radical polymerizable compound and a cation-polymerizable compound. The additional polymerizable compound may be appropriately selected and used in consideration of desired characteristics and a relationship with the radical polymerization initiator.

In the invention, a total content of the polymerizable compounds, namely, a total content of (B) the specific polymerizable compound and a total content of the additional polymerizable compound which can be simultaneously used therewith is in the range of 45 to 95% by mass, and preferably in the range of 50 to 90% by mass on the basis of the mass of the total content of the ink composition for ink jet recording according to the invention.

In the invention, the content of (B) the specific polymerizable compound is preferably in the range of 1 to 60% by mass, preferably in the range of 2 to 50% by mass, more preferably in the range of 5 to 40% by mass, on the basis of the total content of the polymerizable compounds contained in the ink composition for ink jet recording according to the invention (namely, a total content of the specific polymerizable compound and the additional polymerizable compound).

Explanations regarding the additional polymerizable compound which can be used in the invention will be provided hereinafter.

The radical-polymerizable compound is a compound having a radical-polymerizable ethylenic unsaturated bond, and may be any compound as long as it has at least one radical-polymerizable ethylenic unsaturated bond in the molecule. The chemical form of the compound may be a monomer, oligomer, polymer, or the like. The radical-polymerizable compound may be used singly or in combination of two or more thereof with an arbitrary mixing ratio for improving desired properties. It is preferable that two or more multifunctional compounds are used in combination in view of controlling the reactively and the properties such as physical properties.

Examples of the radical-polymerizable compound having a radical-polymerizable ethylenic unsaturated bond include: unsaturated carboxylic acids such as acrylic acid, methacrylic acid, itaconic acid, crotonic acid, isocrotonic acid or maleic acid; salts thereof, and anhydrides thereof; acrylonitrile; styrene; various unsaturated polyesters; unsaturated polyethers; unsaturated polyamides; unsaturated urethanes; and the like.

Specific examples thereof include an acrylic acid derivative such as 2-hydroxyethyl acrylate, butoxyethyl acrylate, carbitol acrylate, cyclohexyl acrylate, tetrahydrofurfuryl acrylate, benzyl acrylate, tridecyl acrylate, 2-phenoxyethyl acrylate, bis(4-acryloyloxypolyethoxyphenyl)propane, polyethylene glycol diacrylate, polypropylene glycol diacrylate, dipentaerythritol tetraacrylate, trimethylol propane triacrylate, oligoester acrylate, N-methylol acrylamide, diacetone acryloamide, epoxyacrylate, isobornyl acrylate, dicyclopentenyl acrylate or dicyclopentenyloxyethyl acrylate; a methacrylic acid derivative such as methyl methacrylate, n-butyl methacrylate, allyl methacrylate, glycidyl methacrylate, benzyl methacrylate, dimethylaminomethyl methacrylate, polyethylene glycol dimethacrylate, polypropylene glycol dimethacrylate, or 2,2-bis(4-methacryloxypolyethoxyphenyl)propane; and an allyl compound derivative such as allyl glycidyl ether, diallyl phthalate, or triallyl trimellitate. More specifically, radical polymerizable or crosslinkable monomers, oligomers and polymers commercially available or known in the art are also usable, such as those described in Shinzo Yamashita Ed., "Crosslinking Agent Handbook", (1981, Taisei Publishing); Kiyoshi Kato Ed., "UV-EB Curing Handbook (Raw Material)" (1985, Kobunshi Kankokai); RadTech Japan Ed., "Application and Market of UV-EB Curing Technology", p. 79, (1989, CMC); and Eiichiro Takiyama, "Polyester Resin Handbook", (1988, Nikkankogyo Shimbun), the disclosures of which are incorporated herein by reference.

Of those acrylates and methacrylates, acrylates of alcohol having an ether oxygen atom, such as tetrahydrofurfuryl acrylate and 2-phenoxyethyl acrylate, are preferred from the standpoints of curability and properties of a film after curing. Acrylates of alcohol having an alicyclic structure are preferred from the same reasons, and preferable examples thereof include acrylates having a bicyclo ring structure or a tricyclo ring structure such as isobornyl acrylate, dicyclopentenyl acrylate, dicyclopentenyloxyethyl acrylate and dicyclopentanyl acrylate. Among these acrylates having a bicyclo ring structure or a tricyclo ring structure, those having a double bond in an alicyclic structure, such as dicyclopentenyl acrylate and dicyclopentenyloxyethyl acrylate, are particularly preferred.

Examples of the radical-polymerizable compound which may be used in the invention further include photo-curing polymerizable compounds used in the photopolymerizable compositions described in JP-B No. 7-31399 and JP-A Nos. 7-159983, 8-224982, 10-863, 9-134011 and 2004-514014.

Preferable examples of the radical-polymerizable compound further include a vinyl ether compound. Specific examples thereof include divinyl or trivinyl ether compounds such as ethylene glycol divinyl ether, ethylene glycol monovinyl ether, diethylene glycol divinyl ether, triethylene glycol monovinyl ether, triethylene glycol divinyl ether, propylene glycol divinyl ether, dipropylene glycol divinyl ether, butanediol divinyl ether, hexanediol divinyl ether, cyclohexane dimethanol divinyl ether, hydroxyethyl monovinyl ether, hydroxynonyl monovinyl ether, or trimethylolpropane trivinyl ether; monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexane dimethanol monovinyl ether, n-propyl vinyl ether, isopropyl vinyl ether, isopropenyl ether-o-propylene carbonate, dodecyl vinyl ether, diethylene glycol monovinyl ether, or octadecyl vinyl ether; and the like.

Commercial monomers such as RAPI-CURE DVE-3 or RAPI-CURE DVE-2 (both produced by ISP Europe) may also be used as the vinyl ether compound.

Among these vinyl ether compounds, from the standpoint of curability, adhesion property, and surface hardness, divinyl ether compounds and trivinyl ether compounds are preferable, and divinyl ether compounds are particularly preferable. The vinyl ether compounds may be used singly or in combination of two or more thereof in accordance with necessity.

Examples of the additional polymerizable compound further include (meth)acrylic acid esters such as a (meth)acrylic monomer, a (meth)acrylic prepolymer, an epoxy monomer, an epoxy prepolymer, an urethane monomer or an urethane prepolymer (hereinafter arbitrarily called as an acrylate compound). Specific examples of such additional polymerizable compound include compounds described below.

Namely, specific examples of the acrylate compound include 2-ethylhexyl-diglycol acrylate, 2-hydroxy-3-phenoxypropyl acrylate, 2-hydroxybutyl acrylate, hydroxypivalic acid neopentylglycol diacrylate, 2-acryloyloxyethyl phtharic acid, methoxy-polyethylene glycol acrylate, tetramethylolmethane triacrylate, 2-acryloyloxyethyl-2-hydroxyethyl phtharic acid, dimethyloltricyclodecane diacrylate, ethoxylated phenyl acrylate, 2-acryloyloxyethyl succinic acid, nonylphenol EO adduct acrylate, modified glycerin triacrylate, bisphenol A diglycidyl ether acrylic acid adduct, modified bisphenol A diacrylate, phenoxy-polyethylene glycol acrylate, 2-acryloyloxyethylhexahydrophthalic acid, bisphenol A PO adduct diacrylate, bisphenol A EO adduct diacrylate, dipentaerythritol hexaacrylate, pentaerythritol triacrylate tolylene diisocyanate urethane prepolymer, lactone-modified flexible acrylate, butoxyethyl acrylate, propylene glycol diglycidyl ether acrylic acid adduct, pentaerythritol triacrylate hexamethylenediisocyanate urethane prepolymer, 2-hydroxyethyl acrylate, methoxydipropylene glycol acrylate, ditrimethylolpropane tetraacrylate, stearyl acrylate, isoamyl acrylate, isomyristyl acrylate, isostearyl acrylate, and lactone-modified acrylate.

These acrylate compounds are preferable since they are polymerizable compounds conventionally used in UV curable inks as they are less irritative or less sensitizing to skin (having small inductivity of rashes on the skin) and can provide a stable ink-ejecting property with a relatively low viscosity as well as a good polymerization sensitivity and a good adhesion to a recording medium.

Even though these monomers described as the additional polymerizable compounds have a low molecular weight, each of them has a low sensitizing property to skin, a high reactivity, a low viscosity, and an excellent adhesion to the recording medium.

From the viewpoint of improving sensitivity, resistance to bleeding, and adhesion property to recording media, it is preferable to additionally use, as a component of the additional polymerizable compound, a combination of the monoacrylate and either a polyfunctional acrylate monomer or oligomer having a molecular weight of 400 or more (preferably 500 or more).

It is particularly preferable to use a combination of a monoacrylate monomer selected from the above, a component selected from the specific polymerizable compound, and either the polyfunctional acrylate monomer or the polyfunctional acrylate oligomer in an ink composition used for recording to flexible recording media such as PET films or PP films, because such a combination can further improve the adhesion to recording media by providing flexibility to a film formed by the ink composition while increasing a strength of the film.

In an embodiment of the invention, a combination of three kinds of polymerizable compound (, namely, a monofunctional acrylate monomer, a bifunctional acrylate monomer, and a polyfunctional acrylate monomer having tri- or higher-functionality) is preferably used. Such a combination provides improvements in the sensitivity, resistance to bleeding, and adhesion to recording media while securing safety.

The monoacrylate is preferably stearyl acrylate, isoamyl acrylate, isomyristyl acrylate, or isostearyl acrylate since they provide high sensitivity and low shrinking property to prevent curling, as well as preventing bleeding and odor of printed materials and reduction of cost of an irradiation apparatus.

The oligomer which can be used in combination with the monoacrylate includes especially preferably an epoxy acrylate oligomer and an urethane acrylate oligomer.

In addition, the methacrylate shows a lower irritant property to the skin than the acrylate.

Among the above compounds, a case where the amount used of an alkoxy acrylate is 70% by mass or less and the remainder is the amount of an acrylate is preferable, because it has good properties with respective to sensitivity, bleeding and odor.

In the invention, when any one of the acrylate compounds as described above is used as the additional polymerizable compound, an amount of the acrylate compound is preferably 30% by mass or more, more preferably 40% by mass or more and, still more preferably 50% by mass or more based on a total mass of the additional polymerizable compound(s). Further, all of the additional polymerizable compounds to be simultaneously used can be selected from among the above-described acrylate compounds.

The selection of the polymerization initiator and the polymerizable compound in the invention may be done in accordance with various purposes such as the prevention of the deterioration in sensitivity caused by the light-shielding effect of the colorant used in the ink composition. For example, the ink composition may contain a combination of the radical polymerizable compound and the radical polymerization initiator. Alternatively, the ink composition may be formed as a radical-cation hybrid curable ink using both of the combination of the radical polymerizable compound and the radical polymerization initiator and a combination of a cation-polymerizable compound and a cation polymerization initiator.

<Sensitizing Dye>

The ink composition according to the invention may contain a sensitizing dye in order to promote degradation of the polymerization initiator caused by irradiation of actinic ray. The sensitizing dye absorbs a specific actinic radiation to take an electronically excited state. The sensitizing dye in the electronically excited state contacts the polymerization initiator to cause electron transfer, energy transfer, heat generation, or the like. As a result, the polymerization initiator undergoes a chemical change to be decomposed, thereby generating radical, acid, or base.

Compounds which are adapted to a wavelength of actinic radiation which causes generation of a polymerization starter in the polymerization initiator and used for the ink composition can be used as the sensitizing dye. In consideration of the application for curing reactions of general ink compositions, examples of the sensitizing dye according to the invention include the dyes belonging to the compound groups listed below as well as having an absorption wavelength in the wavelength range of 350 to 450 nm.

Typical examples thereof include polynuclear aromatic compounds (e.g., anthracene, pyrene, perylene, and triphenylene), thioxanthones (e.g., isopropyl thioxanthone), xanthenes (e.g., fluorescein, eosin, erythrocin, rhodamine B, and rose bengal), cyanines (e.g., thiacarbocyanine and oxacarbocyanine), merocyanines (e.g., merocyanine and carbomerocyanine), thiazines (e.g., thionine, methylene blue, and toluidine blue), acridines (e.g., acridine orange, chloroflavine, and acriflavine), anthraquinones (e.g., anthraquinone), squaryliums (e.g., squarylium), coumarins (e.g., 7-diethylamino-4-methylcoumarin) and the like. Preferable examples thereof include polynuclear aromatic compounds and thioxanthones.

<Cosensitizer>

In one embodiment, the ink composition for ink jet recording according to the present invention may further contain a cosensitizer. The cosensitizer has functions of improving the sensitivity of the sensitizing dye to the actinic radiation, suppressing the polymerization inhibition by oxygen, and the like.

Examples of the cosensitizer include amines such as those described in M. R, Sander et al., "Journal of Polymer Society" vol. 10, p. 3173, (1972), JP-B No. 44-20189, JP-A Nos. 51-82102, 52-134692, 59-138205, 60-84305, 62-18537, and 64-33104 or Research Disclosure 33825; and specific examples thereof include triethanolamine, ethyl p-dimethylaminobenzoate, p-formyldimethylaniline, p-methylthiodimethylaniline, and the like.

Other examples of the cosensitizer include thiols and sulfides, such as thiol compounds described in JP-A No. 53-702, JP-B No. 55-500806, or JP-A No. 5-142772, or disulfide compounds described in JP-A No. 56-75643. Specific examples thereof include 2-mercaptobenzothiazole, 2-mercaptobenzoxazole, 2-mercaptobenzimidazole, 2-mercapto-4 (3H)-quinazoline, and β-mercaptonaphthalene.

Yet other examples of the cosensitizer include amino acid compounds (e.g., N-phenylglycine), the organic metal compounds described in JP-B No. 48-42965 (e.g., tributyltin acetate), the hydrogen donors described in JP-B No. 55-34414, the sulfur compounds described in JP-A No. 6-308727 (e.g., trithiane), the phosphorus compounds described in JP-A No. 6-250387 (e.g., diethyl phosphite), and the Si—H and Ge—H compounds described in Japanese Patent Application No. 8-65779.

<Other Components>

The ink composition according to the invention may further contain other components in accordance with necessity. Examples of such additional components include polymerization inhibitors, solvents, and the like.

A polymerization inhibitor may be added to the ink composition according to the invention for improvement in storability. When the ink composition according to the invention is applied to inkjet recording, it is preferable to heat the composition to a temperature in the range of 40 to 80° C. so as to reduce the viscosity of the ink before ejection; and thus, the addition of a polymerization inhibitor is preferable for the prevention of the head clogging by thermal polymerization. The polymerization inhibitor is preferably added in an amount of 200 to 20,000 ppm with respect to the total amount of the ink composition according to the invention. Examples of polymerization inhibitors include hydroquinone, benzoquinone, p-methoxyphenol, TEMPO (2,2,6,6-tetramethyl-.piperidine-1-oxyl), TEMPOL (4-Hydroxy-2,2,6,6-tetramethyl-piperidine-1-oxyl), and cupferron AI.

Considering that the ink composition for ink jet recording according to the invention is a radiation-curable ink composition, the composition preferably contains no solvent, so that the reaction occurs immediately after deposition to cure the ink composition. The ink composition may contain a predetermined solvent as long as it does not affect the curing speed of ink composition and the like. The solvent may be an organic solvent or water. In particular, an organic solvent may be added for improvement in adhesiveness to the recording medium (support such as paper). Addition of an organic solvent is effective for the prevention of the problem of VOCs.

The amount of organic solvent is, for example, in the range of 0.1 to 5% by mass, preferably in the range of 0.1 to 3% by mass, with respect to the total mass of the ink composition according to the invention.

In addition, other known compounds may be added to the ink composition for ink jet recording according to the invention in accordance with necessity. Examples of such additional compounds include a surfactant, a leveling additive, a matting agent, and a resin for adjustment of film physical properties, such as a polyester resin, a polyurethane resin, a vinyl resin, an acrylic resin, a rubber resin, or a wax. Further, addition of a tackifier that does not inhibit polymerization is also preferable in view of the improvement in adhesiveness to recording media such as polyolefin or PET. Specific examples thereof include the high-molecular weight adhesive polymers described in JP-A No. 2001-49200, pp. 5 to 6 (e.g., copolymers of a (meth)acrylic ester of an alcohol having an alkyl group having 1 to 20 carbon atoms, copolymers of a (meth) acrylic ester of an alicyclic alcohol having 3 to 14 carbon atoms, and copolymers of a (meth)acrylic ester of an aromatic alcohol having 6 to 14 carbon atoms), and low-molecular weight adhesive resins having polymerizable unsaturated bonds.

[Properties of Ink Composition for Ink Jet Recording]

Preferable properties of the ink composition for ink jet recording according to the invention are herein explained. Considering the ejection efficiency when applied to ink jet recording, the ink composition for ink jet recording according to the invention preferably has an ink viscosity of 7 to 30 mPa·s, more preferably 7 to 25 mPa·s, at the temperature at the time of ejection (e.g., a temperature in the range of 40 to 80° C., more preferably in the range of 25 to 50° C.). The viscosity at room temperature (25 to 30° C.) of the ink composition for ink jet recording is preferably 10 to 50 mPa·s, more preferably 12 to 40 mPa·s.

It is preferable to properly adjust and determine the ratio of components of the ink composition for ink jet recording according to the invention so that the viscosity falls in the range. By setting the viscosity at room temperature high, it become possible to prevent penetration of the ink into the recording medium even when a porous recording medium is used, to reduce the amount of uncured monomer and the odor, to suppress bleeding upon the deposition of ink droplets, and consequently to improve the image quality.

The surface tension of the ink composition for ink jet recording according to the invention is preferably from 20 to 30 mN/m and more preferably from 23 to 28 mN/m. When the ink is used for recording on various recording media such as polyolefin, PET, coated paper, and non-coated paper, the surface tension is preferably 20 mN/m or more in view of the prevention of bleeding and penetration, and 30 mN/m or less in view of the wettability.

[Inkjet Recording Method]

Hereinafter, the ink jet recording method according to the invention and ink jet recording apparatuses applicable thereto will be described.

The ink jet recording method according to the invention comprises (i-1) ejecting the ink composition as an ink for ink jet recording onto a recording medium and (i-2) curing the ejected ink composition for ink jet recording by irradiation with actinic radiation rays.

The ink jet recording method of the invention forms an image by curing the ink composition on the recording medium by including at least the above-described (i-1) and (i-2).

The (i-1) ejecting in the recording method of the invention may utilize the ink jet recording apparatus that is hereinafter explained in detail.

—Inkjet Recording Apparatus—

The ink jet recording apparatus for use in the invention is not particularly limited, and may be selected from known available ink jet recording apparatuses with sufficient resolution to achieve purposes. That is, in the invention, the (i-1) ejecting of the ink composition on the recording media can be performed by any known ink jet recording apparatuses including commercially available ones.

Examples of usable ink jet recording apparatuses include an apparatus which has at least an ink-supplying system, a temperature sensor, and actinic radiation source.

The ink-supplying system includes, for example, a stock tank storing the ink jet recording ink according to the invention, a supply pipe, an ink-supplying tank immediately before inkjet head, a filter, and a piezo-type inkjet head. The piezo-type inkjet head can be operated such that the ejection is conducted at a resolution in the range of, for example, 320× 320 to 4,000×4,000 dpi, preferably in the range of 400×400 to 1,600×1,600 dpi, and more preferably in the range of 720× 720 dpi, to form multi-sized dots in an amount in the range of 1 to 100 pl, which is preferably in the range of 8 to 30 pl. The unit "dpi" in the invention means the number of dots per 2.54 cm.

As described above, the temperature of the radiation-curable ink at the time of ejection is preferably maintained constant. Therefore, the region from the ink-supplying tank to the inkjet head is preferably thermally insulated and heated. The method of controlling the temperature is not particularly limited. In an embodiment, each piping unit is monitored by multiple temperature sensors and is heated to control the temperature adequately based on the flow rate of ink and the environmental temperature. The temperature sensors may be disposed in the ink-supplying tank and near the nozzles of the inkjet head. In addition, the head unit to be heated is preferably thermally shielded or insulated so as to minimize the environmental influence on the apparatus. It is preferable to insulate the head unit from other units and reduce the heat capacity of the entire unit to be heated in order to shorten the start-up time needed for heating or in order to reduce the loss in heat energy.

When the ink composition for ink jet recording according to the invention is ejected onto the surface of the hydrophilic support, it is preferable to descrease the viscosity of the ink composition to 7 to 30 mPa·s (more preferably 7 to 25 mPa·s) by heating the ink composition to 40 to 80° C. (more preferably 25 to 50° C.) before ejection. Especially as the ink composition for ink jet recording according to the invention, it is preferable to use an ink composition whose ink viscosity at 25° C. is in the range of 35 to 500 mP·s, since significant effects are obtained. In this manner, it is possible to realize highly stable ejection.

Generally, radiation-curable ink compositions, such as the ink composition for ink jet recording according to the invention, are usually more viscous than aqueous inks, and the fluctuation in the viscosity of radiation-curable ink compositions caused by the fluctuation in temperature during printing is larger. The fluctuation in the viscosity of ink composition exerts significant influences on the droplet size and the droplet ejection speed, causing deterioration in image quality, and thus, it is necessary to keep the temperature of the ink composition as constant as possible during printing. It is preferable to control the ink composition temperature within ±5° C. from the set temperature, more preferably ±2° C. from the set temperature, and still more preferably ±1° C. from the set temperature.

The (i-2) curing the ejected ink composition by irradiation with actinic radiation rays in the recording method of the invention is hereinafter explained.

The ink composition ejected on the surface of a recording medium is cured by irradiation with actinic radiation. This is because the polymerization initiator contained in the ink composition according to the invention is decomposed by irradiation of actinic radiation so as to generate a polymerization starter such as a radical, and the function of the polymerization starter is exhibited so as to cause and promote radical polymerization of polymerizable compounds in the ink composition, which may further be copolymerized with the other additional polymerizable compound which are used in combination in accordance with necessity. In a case where a sensitizing dye coexists in the ink composition with the polymerization initiator, the sensitizing dye is excited to the excited state by absorption of actinic radiation, and then the polymerization initiator in the polymerization initiation system is promoted to decomposing upon contact with the sensitizing dye in the excited state, so as to achieve curing of the ink composition with high sensitivity.

Examples of the actinic radiation include α-rays, γ-rays, electron beams, X-rays, ultraviolet rays, visible rays, and infrared rays. Among them, electron beams, ultraviolet rays or visible rays are preferable as the actinic radiation. The peak wavelength of the actinic radiation depends on the absorption characteristics of the sensitizing dye in the ink composition, and it is, for example, preferably in the range of 200 to 600 nm, more preferably in the range of 300 to 450 nm, and still more preferably in the range of 350 to 420 nm.

A polymerization initiating system provided in the invention is sufficiently sensitive to radiation even at a low output. Accordingly, output of the radiation may be, for example, an irradiation energy of 2,000 mJ/cm$^2$ or lower, preferably from 10 to 2,000 mJ/cm$^2$, more preferably from 20 to 1,000 mJ/cm$^2$, and still more preferably from 50 to 800 mJ/cm$^2$.

The actinic radiation may be irradiated such that the illuminance on the exposure plane is, for example, in the range of 10 to 2,000 mW/cm$^2$, and preferably in the range of 20 to 1,000 mW/cm$^2$.

Mercury lamps, gas or solid state lasers and the like are widely used as actinic radiation ray sources, and mercury lamps and metal halide lamps are widely used for UV-curing inkjet. However, under the current strong needs for the elimination of the use of mercury from the viewpoint of environmental protection, it is very important industrially and environmentally to replace mercury lamps with GaN-type semiconductor UV-emitting devices. In addition, LED's (UV-LED) and LD's (UV-LD) are smaller in size, longer in lifetime, higher in efficiency, and lower in cost, and thus, attracting attention as light sources for radiation-curing inkjet printers.

As described above, a light-emitting diode (LED) or a laser diode (LD) may be used as the actinic radiation ray source. An ultraviolet LED or an ultraviolet LD may be used when an ultraviolet ray source is required. For example, a purple LED having a main emission spectrum in the wavelength range of 365 to 420 nm is available from Nichia Corporation. As to a light having a still shorter wavelength, U.S. Pat. No. 6,084, 250 (the disclosure of which is incorporated herein by reference) discloses an LED having a main emission spectrum in the wavelength region of 300 to 370 nm. Other ultraviolet LED's are also commercially available, and capable of emitting radiations of different UV ranges. The radiation ray source used in the invention is preferably a UV-LED, and particularly preferably a UV-LED having a peak wavelength in the range of 350 to 420 nm.

The maximum illuminance of LED light on the image recording medium is preferably from 10 to 2000 mW/cm$^2$, more preferably from 20 to 1000 mW/cm$^2$, and still more preferably from 50 to 800 mW/cm$^2$.

The ink composition according to the invention may be irradiated with actinic radiation rays, for example, for 0.01 to 120 seconds, preferably for 0.1 to 90 seconds.

The irradiation condition and the basic irradiation method with the actinic radiation are disclosed in JP-A No. 60-132767. Specifically, the exposure is performed in a so-called shuttle process, i.e., by scanning with a head unit having an ink-ejecting device and light sources disposed at both sides of the head unit. The actinic radiation is irradiated a certain period (e.g., from 0.01 to 0.5 second, preferably from 0.01 to 0.3 second, and more preferably, from 0.01 to 0.15 second) after ink deposition. When the time between ink deposition and irradiation is very short, it is possible to prevent bleeding of the uncured ink deposited on the recording medium. Further, even when a porous recording medium is used, ink is exposed to radiation before penetrating deep into the recording medium where the radiation does not reach, whereby residual unreacted monomer is reduced to reduce odor.

The curing of the ink may be conducted with a light source that is not driven. WO 99/54415 Pamphlet discloses an irradiation method in which the recording area is irradiated with UV rays by using an optical fiber or by using a mirror disposed on a side wall of the head unit which mirror reflects the collimated light. Such curing methods may also be applied in the ink jet recording method of the invention.

By employing ink jet recording methods such as described above, the dot diameter of the deposited ink can be maintained constant even when various recording media that are different in surface wettability is used, thus improving the image quality. In order to obtain a color image by the ink jet recording method according to the invention, it is preferable to form images by in an order in which a color having higher lightness overcoats another color(s) having lower lightness. When color inks are applied in that order, the radiation rays reaches inks located at the bottom; therefore, superior curing sensitivity, reduction in the amount of residual monomer and odor, and improvement in adhesiveness are achieved. Although it is possible to conduct the irradiation with radiation after a full-color image is formed, it is preferable to irradiate the image with radiation after each color ink is deposited, in view of the acceleration of curing.

Thus, when the ink composition for ink jet recording of the invention is used, it is possible to form an image having high definition and high intensity on the surface of a recording medium by curing the ink composition with high sensitivity by irradiation with actinic radiation. Furthermore, it is also possible to form an image having excellent adhesiveness to a recording medium.

Moreover, the ink composition for ink jet recording of the invention exhibits excellent ejection stability without causing precipitation of the components of the composition at the periphery of an inkjet head and the like in applying the ink composition to an inkjet apparatus. Therefore, stable image formation can be performed.

EXAMPLES

The present invention is further specifically described below by the Examples, but the invention is not construed as being limited to those Examples. The following Examples relate to an ink for UV ink jet recording of each color. In the following description, unless otherwise indicated, all "parts" are "parts by mass".

Example 1

The following components were stirred with a high speed stirring machine equipped with a water cooling system to obtain a cyan color ink composition for UV inkjet.

| (Cyan color ink composition) | |
|---|---|
| N-vinylcaprolactam: Component (A) (manufactured by ISP (Japan) Ltd., trade name: V-CAP) | 18.0 parts |
| Specific polymerizable compound [exemplified compound (B-1): component (B)] | 9.0 parts |
| Bifunctional ethylenically unsaturated monomer (manufactured by Hitachi Chemical Industry, Co., Ltd., trade name: FA-512A) | 13.2 parts |
| Monofunctional ethylenically unsaturated monomer (manufactured by Sartomer Company, trade name: SR339) | 49.0 parts |
| SOLSPERSE 32000 (trade name, manufactured by Noveon Inc., dispersant) | 1.2 parts |
| IRGALITE BLUE GLVO (trade name, manufactured by Ciba Specialty Chemicals, pigment) | 3.0 parts |
| FIRSTCURE ST-1 (trade name, manufactured by ChemFirst Inc., polymerization inhibitor) | 0.05 part |
| LUCIRIN TPO (trade name, manufactured by BASF, photoinitiator): component (C) | 4.0 parts |
| IRGACURE 369: component (C) (trade name, manufactured by Ciba Specialty Chemicals, photoinitiator) | 0.5 part |
| 4-Phenylbenzophenone: component (C) (manufactured by Tokyo Chemical Industry Co., Ltd., photoinitiator) | 1.0 part |
| DAROCUR ITX: component (C) (trade name, manufactured by Ciba Specialty Chemicals, photoinitiator) | 1.0 part |
| BYK 307 (trade name, manufactured by BYK Chemie, defoamer) | 0.05 part |

(Evaluation of Ink Composition)

Recording was conducted on a polyvinyl chloride sheet using the cyan color ink composition obtained in Example 1 and an ink jet recording apparatus having a piezo-type inkjet head (CA3 head, manufactured by Toshiba Tec Corporation). An ink supply system is configured to include a stock tank, a supply pipe, an ink-supplying tank immediately before an inkjet head, a filter and a piezo-type inkjet head, and the temperature was controlled such that the nozzle part was always 45° C.±3° C. (100% coverage image was printed). After ejecting the ink composition, irradiation was conducted by passing at a rate of 40 m/min under light of an ultraviolet lamp (power 120 W/cm²) doped with iron to cure the ink composition, and a printed matter was obtained. An ink layer of the printed matter had an average film thickness of about 13 μm.

In this case, the following evaluation was performed. The results are shown in Table 1.

<Curing Sensitivity>

Exposure energy required for curing was measured by a light amount integrating meter (manufactured by EIT, trade name: UV POWER MAP). As a value measured thereby was smaller, the ink composition was evaluated as higher in sensitivity for curing. As a result, the integrated exposure amount of ultraviolet light on the sheet of about 400 mJ/cm² was required for curing the ink composition of Example 1, and it was confirmed that the ink composition of Example 1 was cured with high sensitivity.

<Curability>

Curability was evaluated by physically touching an image portion formed after curing the ink composition of the printed matter with an integrated exposure amount of ultraviolet light on the sheet of about 400 mJ/cm². The curability is evaluated by the presence or absence of adhesiveness on the surface of a cured film.

As a result, adhesiveness after curing completely disappeared, and it was confirmed that the ink composition of Example 1 is excellent in curability.

<Adhesiveness to Recording Medium>

Adhesiveness to a recording medium is evaluated by a cross-hatch test (EN ISO2409), and is expressed by grades 5B to 1B according to the notations of the ASTM method. It is evaluated that 5B shows the most excellent adhesiveness, and 3B or higher is a level having no practical problem.

As a result, the ink composition of Example 1 has high adhesiveness, and its value showed 4B in the notation of the ASTM method.

<Flexibility of Cured Film>

Flexibility of a cured film was evaluated as follows. A printed matter having a length of 6 cm and a width of 2 cm was stretched together with a polyvinyl chloride sheet at room temperature (about 25° C.), and the degree of elongation until an image breaks was measured, and evaluated by the following criteria.

A: Degree of elongation is 200% or more (sample was elongated to 18 cm or more).

B: Degree of elongation is from 150% to less than 200% (sample was elongated to 15 cm to less than 18 cm).

C: Degree of elongation is from 100% to less than 150% (sample was elongated to 12 cm to less that 15 cm).

D: Degree of elongation is less than 100% (sample was broken at less than 12 cm).

<Ejection Stability>

After storing the ink composition obtained at 35° C. for 12 weeks, recording was conducted on a recording medium using the ink jet recording apparatus having a piezo-type inkjet nozzle. The presence or absence of dot-loss and scattering of an ink when printing was continuously conducted at ordinary temperature for 2 hours was visually observed, and evaluated by the following standard.

A: Dot-loss or scattering of ink does not occur, or occurs with the number of occurrences is 5 less.

B: Dot-loss or scattering of ink occurs with the number of occurrences is 6 to 20.

C: Dot-loss or scattering of ink occurs with the number of occurrences is 21 or more.

<Blocking Resistance>

A polyvinyl chloride sheet which was not printed was faced and adhered to a printed face of a printed matter of 105 mm×148 mm. Load of 4 kg was applied to the resulting laminate at room temperature (about 25° C.) for 36 hours. Two sheets were then separated, and deposition of an ink to the sheet which was not printed was observed, and evaluated by the following criteria.

A: Adhesion of ink is not observed.

B: Adhesion of ink is slightly observed.

C: Ink is adhered to the sheet which was not printed.

Example 2

The following components were stirred with a high speed stirring machine equipped with a water cooling system to obtain a magenta color ink composition for UV inkjet.

| (Magenta color ink composition) | |
|---|---|
| N-vinylcaprolactam: Component (A) (manufactured by ISP (Japan) Ltd., trade name: V-CAP) | 24.4 parts |
| Specific polymerizable compound [exemplified compound (B-1): component (B)] | 8.0 parts |
| Monofunctional ethylenically unsaturated monomer (manufactured by Sartomer Company, trade name: SR339) | 51.2 parts |
| Polyfunctional ethylenically unsaturated monomer (manufactured by Sartomer Company, trade name: SR399) | 1.0 parts |
| RAPI-CURE DVE-3 (trade name, manufactured by ISP Europe, vinyl ether compound) | 4.0 parts |
| SOLSPERSE 32000 (manufactured by Noveon Inc., dispersant) | 1.2 parts |
| CINQUASIA MAZENTA RT-355D (trade name, manufactured by Ciba Specialty Chemicals, pigment) | 3.6 parts |
| FIRSTCURE ST-1 (trade name, manufactured by ChemFirst Inc., polymerization inhibitor) | 0.05 part |
| LUCIRIN TPO (trade name, manufactured by BASF, photoinitiator): component (C) | 3.0 parts |
| IRGACURE 819: component (C) (trade name, manufactured by Ciba Specialty Chemicals, photoinitiator) | 1.0 part |
| IRGACURE 369: component (C) (trade name, manufactured by Ciba Specialty Chemicals, photoinitiator) | 0.5 part |
| 4-Phenylbenzophenone: component (C) (manufactured by Tokyo Chemical Industry Co., Ltd., photoinitiator) | 1.0 part |
| DAROCUR ITX: component (C) (trade name, manufactured by Ciba Specialty Chemicals, photoinitiator) | 1.0 part |
| BYK 307 (trade name, manufactured by BYK Chemie, defoamer) | 0.05 part |

The magenta color ink composition obtained in Example 2 was ejected on a sheet made of a polyvinyl chloride in the same manner as in Example 1, and cured. The printed matter by this ink composition was evaluated in the same manner as in Example 1. The results are shown in Table 1.

Example 3

The following components were stirred with a high speed stirring machine equipped with a water cooling system to obtain a magenta color ink composition for UV inkjet.

| (Magenta color ink composition) | |
|---|---:|
| N-vinylcaprolactam: Component (A) (manufactured by ISP (Japan) Ltd., trade name: V-CAP) | 24.4 parts |
| Specific polymerizable compound [exemplified compound (B-2): component (B)] (manufactured by Hitachi Chemical Co., Ltd., trade name: FA-711MM) | 8.0 parts |
| Monofunctional ethylenically unsaturated monomer (manufactured by Sartomer Company, trade name: SR339) | 50.2 parts |
| Polyfunctional ethylenically unsaturated monomer (manufactured by Sartomer Company, trade name: SR399) | 2.0 parts |
| RAPI-CURE DVE-3 (trade name, manufactured by ISP Europe, vinyl ether compound) | 4.0 parts |
| SOLSPERSE 32000 (manufactured by Noveon Inc., dispersant) | 1.2 parts |
| CINQUASIA MAZENTA RT-355D (trade name, manufactured by Ciba Specialty Chemicals, pigment) | 3.6 parts |
| FIRSTCURE ST-1 (trade name, manufactured by ChemFirst Inc., polymerization inhibitor) | 0.05 part |
| LUCIRIN TPO (trade name, manufactured by BASF, photoinitiator): component (C) | 3.0 parts |
| IRGACURE 819: component (C) (trade name, manufactured by Ciba Specialty Chemicals, photoinitiator) | 1.0 part |
| IRGACURE 369: component (C) (trade name, manufactured by Ciba Specialty Chemicals, photoinitiator) | 0.5 part |
| 4-Phenylbenzophenone: component (C) (manufactured by Tokyo Chemical Industry Co., Ltd., photoinitiator) | 1.0 part |
| DAROCUR ITX: component (C) (trade name, manufactured by Ciba Specialty Chemicals, photoinitiator) | 1.0 part |
| BYK 307 (trade name, manufactured by BYK Chemie, defoamer) | 0.05 part |

The magenta color ink composition obtained in Example 3 was ejected on a sheet made of a polyvinyl chloride in the same manner as in Example 1, and cured. The printed matter by this ink composition was evaluated in the same manner as in Example 1. The results are shown in Table 1.

Example 4

The following components were stirred with a high speed stirring machine equipped with a water cooling system to obtain a magenta color ink composition for UV inkjet.

| (Magenta color ink composition) | |
|---|---:|
| N-vinylcaprolactam: Component (A) (manufactured by ISP (Japan) Ltd., trade name: V-CAP) | 24.4 parts |
| Specific polymerizable compound [exemplified compound (B-21): component (B)] (manufactured by Hitachi Chemical Co., Ltd., trade name: FA-711HM) | 8.0 parts |
| Monofunctional ethylenically unsaturated monomer (manufactured by Sartomer Company, trade name: SR339) | 48.2 parts |
| Polyfunctional ethylenically unsaturated monomer (manufactured by Sartomer Company, trade name: SR399) | 4.0 parts |
| RAPI-CURE DVE-3 (trade name, manufactured by ISP Europe, vinyl ether compound) | 4.0 parts |
| SOLSPERSE 32000 (manufactured by Noveon Inc., dispersant) | 1.2 parts |
| CINQUASIA MAZENTA RT-355D (trade name, manufactured by Ciba Specialty Chemicals, pigment) | 3.6 parts |
| FIRSTCURE ST-1 (trade name, manufactured by ChemFirst Inc., polymerization inhibitor) | 0.05 part |
| LUCIRIN TPO (trade name, manufactured by BASF, photoinitiator): component (C) | 3.0 parts |
| IRGACURE 819: component (C) (trade name, manufactured by Ciba Specialty Chemicals, photoinitiator) | 1.0 part |
| IRGACURE 369: component (C) (trade name, manufactured by Ciba Specialty Chemicals, photoinitiator) | 0.5 part |
| 4-Phenylbenzophenone: component (C) (manufactured by Tokyo Chemical Industry Co., Ltd., photoinitiator) | 1.0 part |
| DAROCUR ITX: component (C) (trade name, manufactured by Ciba Specialty Chemicals, photoinitiator) | 1.0 part |
| BYK 307 (trade name, manufactured by BYK Chemie, defoamer) | 0.05 part |

The magenta color ink composition obtained in Example 4 was ejected on a sheet made of a polyvinyl chloride in the same manner as in Example 1, and cured. The printed matter by this ink composition was evaluated in the same manner as in Example 1. The results are shown in Table 1.

Example 5

The following components were stirred with a high speed stirring machine equipped with a water cooling system to obtain a black color ink composition for UV inkjet.

| (Black color ink composition) | |
|---|---|
| N-vinylcaprolactam: Component (A) (manufactured by ISP (Japan) Ltd., trade name: V-CAP) | 14.4 parts |
| Specific polymerizable compound [exemplified compound (B-15): component (B)] | 4.0 parts |
| Bifunctional ethylenically unsaturated monomer (manufactured by Sartomer Company, trade name: SR9045) | 15.2 parts |
| Monofunctional ethylenically unsaturated monomer (manufactured by Sartomer Company, trade name: SR339) | 48.0 parts |
| Polyfunctional ethylenically unsaturated monomer (manufactured by Sartomer Company, trade name: SR399) | 4.0 parts |
| RAPI-CURE DVE-3 (manufactured by ISP Europe, vinyl ether compound) | 4.0 parts |
| SOLSPERSE 32000 (trade name, manufactured by Noveon Inc., dispersant) | 1.2 parts |
| MICROLITH BLACK C-K (trade name, manufactured by Ciba Specialty Chemicals, pigment) | 2.6 parts |
| FIRSTCURE ST-1 (trade name, manufactured by ChemFirst Inc., polymerization inhibitor) | 0.05 part |
| LUCIRIN TPO (trade name, manufactured by BASF, photoinitiator): component (C) | 4.0 parts |
| IRGACURE 369: component (C) (trade name, manufactured by Ciba Specialty Chemicals, photoinitiator) | 0.5 part |
| Benzophenone: component (C) (manufactured by Tokyo Chemical Industry Co., Ltd., photoinitiator) | 1.0 part |
| DAROCUR ITX: component (C) (trade name, manufactured by Ciba Specialty Chemicals, photoinitiator) | 1.0 part |
| BYK 307 (trade name, manufactured by BYK Chemie, defoamer) | 0.05 part |

The black color ink composition obtained in Example 5 was ejected on a sheet made of a polyvinyl chloride in the same manner as in Example 1, and cured. The printed matter by this ink composition was evaluated in the same manner as in Example 1. The results are shown in Table 1.

Example 6

The following components were stirred with a high speed stirring machine equipped with a water cooling system to obtain a yellow color ink composition for UV inkjet.

| (Yellow color ink composition) | |
|---|---|
| N-vinylcaprolactam: Component (A) (manufactured by ISP (Japan) Ltd., trade name: V-CAP) | 24.4 parts |
| Specific polymerizable compound [exemplified compound (B-1): component (B)] | 8.0 parts |
| Monofunctional ethylenically unsaturated monomer (manufactured by Sartomer Company, trade name: SR339) | 51.2 parts |
| Polyfunctional ethylenically unsaturated monomer (manufactured by Sartomer Company, trade name: SR399) | 1.0 parts |
| RAPI-CURE DVE-3 (trade name, manufactured by ISP Europe, vinyl ether compound) | 4.0 parts |
| SOLSPERSE 32000 (trade name, manufactured by Noveon Inc., dispersant) | 1.2 parts |
| CROMOPHTHAL YELLOW LA (trade name, manufactured by Ciba Specialty Chemicals, pigment) | 3.6 parts |
| FIRSTCURE ST-1 (trade name, manufactured by ChemFirst Inc., polymerization inhibitor) | 0.05 part |
| LUCIRIN TPO (trade name, manufactured by BASF, photoinitiator): component (C) | 2.0 parts |
| IRGACURE 819: component (C) (trade name, manufactured by Ciba Specialty Chemicals, photoinitiator) | 1.0 part |
| IRGACURE 369: component (C) (trade name, manufactured by Ciba Specialty Chemicals, photoinitiator) | 0.5 part |
| IRGACURE 127: component (C) (trade name, manufactured by Ciba Specialty Chemicals, photoinitiator) | 1.0 part |
| 4-Phenylbenzophenone: component (C) (manufactured by Tokyo Chemical Industry Co., Ltd., photoinitiator) | 1.0 part |
| DAROCUR ITX: component (C) (trade name, manufactured by Ciba Specialty Chemicals, photoinitiator) | 1.0 part |
| BYK 307 (trade name, manufactured by BYK Chemie, defoamer) | 0.05 part |

The yellow color ink composition obtained in Example 6 was ejected on a sheet made of a polyvinyl chloride in the same manner as in Example 1, and cured. The printed matter by this ink composition was evaluated in the same manner as in Example 1. The results are shown in Table 1.

Example 7

The following components were stirred with a high speed stirring machine equipped with a water cooling system to obtain a white color ink composition for UV inkjet.

| (White color ink composition) | |
|---|---|
| N-vinylcaprolactam: Component (A) (manufactured by ISP (Japan) Ltd., trade name: V-CAP) | 15.6 parts |
| Specific polymerizable compound [exemplified compound (B-1): component (B)] | 10.0 parts |
| Monofunctional acrylate (manufactured by Sartomer Company, trade name: SR339) | 50.0 parts |
| SOLSPERSE 36000 (trade name, manufactured by Noveon Inc., dispersant) | 2.4 parts |
| MICROLITH WHITE R-A (trade name, manufactured by Ciba Specialty Chemicals, pigment) | 16.0 parts |
| FIRSTCURE ST-1 (trade name, manufactured by ChemFirst Inc., polymerization inhibitor) | 0.05 part |
| LUCIRIN TPO (trade name, manufactured by BASF, photoinitiator): component (C) | 4.2 parts |
| IRGACURE 369: component (C) (trade name, manufactured by Ciba Specialty Chemicals, photoinitiator) | 0.3 part |
| 4-Phenylbenzophenone: component (C) (manufactured by Tokyo Chemical Industry Co., Ltd., photoinitiator) | 1.0 part |
| DAROCUR ITX: component (C) (trade name, manufactured by Ciba Specialty Chemicals, photoinitiator) | 0.4 part |
| BYK 307 (trade name, manufactured by BYK Chemie, defoamer) | 0.05 part |

The white color ink composition obtained in Example 7 was ejected on a sheet made of a polyvinyl chloride in the same manner as in Example 1, and cured. The printed matter by this ink composition was evaluated in the same manner as in Example 1. The results are shown in Table 1.

Comparative Example 1

The following components were stirred with a high speed stirring machine equipped with a water cooling system to obtain a cyan color ink composition for UV inkjet.

| (Cyan color ink composition) | |
|---|---|
| Specific polymerizable compound [exemplified compound (B-1): component (B)] | 9.0 parts |
| Bifunctional ethylenically unsaturated monomer (manufactured by Hitachi Chemical Co., Ltd., trade name: FA-512A) | 20.2 parts |
| Monofunctional ethylenically unsaturated monomer (manufactured by Sartomer Company, trade name: SR339) | 60.0 parts |
| SOLSPERSE 32000 (trade name, manufactured by Noveon Inc., dispersant) | 1.2 parts |
| IRGALITE BLUE GLVO (trade name, manufactured by Ciba Specialty Chemicals, pigment) | 3.0 parts |
| FIRSTCURE ST-1 (trade name, manufactured by ChemFirst Inc., polymerization inhibitor) | 0.05 part |
| LUCIRIN TPO (trade name, manufactured by BASF, photoinitiator): component (C) | 4.0 parts |
| IRGACURE 369: component (C) (trade name, manufactured by Ciba Specialty Chemicals, photoinitiator) | 0.5 part |
| 4-Phenylbenzophenone: component (C) (manufactured by Tokyo Chemical Industry Co., Ltd., photoinitiator) | 1.0 part |
| DAROCUR ITX: component (C) (trade name, manufactured by Ciba Specialty Chemicals, photoinitiator) | 1.0 part |
| BYK 307 (trade name, manufactured by BYK Chemie, defoamer) | 0.05 part |

The cyan color ink composition obtained in Comparative Example 1 was ejected on a sheet made of a polyvinyl chloride in the same manner as in Example 1, and cured. The printed matter by this ink composition was evaluated in the same manner as in Example 1. The results are shown in Table 1.

Comparative Example 2

The following components were stirred with a high speed stirring machine equipped with a water cooling system to obtain a cyan color ink composition for UV inkjet.

| (Cyan color ink composition) | |
|---|---|
| N-vinylcaprolactam: Component (A) (manufactured by ISP (Japan) Ltd., trade name: V-CAP) | 18.0 parts |
| Bifunctional ethylenically unsaturated monomer (manufactured by Hitachi Chemical Co., Ltd., trade name: FA-512A) | 15.2 parts |
| Monofunctional ethylenically unsaturated monomer (manufactured by Sartomer Company, trade name: SR339) | 56.0 parts |
| SOLSPERSE 32000 (trade name, manufactured by Noveon Inc., dispersant) | 1.2 parts |
| IRGALITE BLUE GLVO (trade name, manufactured by Ciba Specialty Chemicals, pigment) | 3.0 parts |
| FIRSTCURE ST-1 (trade name, manufactured by ChemFirst Inc., polymerization inhibitor) | 0.05 part |
| LUCIRIN TPO (trade name, manufactured by BASF, photoinitiator): component (C) | 4.0 parts |
| IRGACURE 369: component (C) (trade name, manufactured by Ciba Specialty Chemicals, photoinitiator) | 0.5 part |
| 4-Phenylbenzophenone: component (C) (manufactured by Tokyo Chemical Industry Co., Ltd., photoinitiator) | 1.0 part |
| DAROCUR ITX: component (C) (trade name, manufactured by Ciba Specialty Chemicals, photoinitiator) | 1.0 part |
| BYK 307 (trade name, manufactured by BYK Chemie, defoamer) | 0.05 part |

The cyan color ink composition obtained in Comparative Example 2 was ejected on a sheet made of a polyvinyl chloride in the same manner as in Example 1, and cured. The printed matter by this ink composition was evaluated in the same manner as in Example 1. The results are shown in Table 1.

Comparative Example 3

The following components were stirred with a high speed stirring machine equipped with a water cooling system to obtain a cyan color ink composition for UV inkjet.

| (Cyan color ink composition) | |
|---|---|
| N-vinylcaprolactam: Component (A) (manufactured by ISP (Japan) Ltd., trade name: V-CAP) | 18.0 parts |
| Comparative amine compound (structure shown below) (manufactured by Ciba Specialty Chemicals, trade name: TINUVIN 292) | 9.0 parts |
| Bifunctional ethylenically unsaturated monomer (manufactured by Hitachi Chemical Co., Ltd., trade name: FA-512A) | 13.2 parts |
| Monofunctional ethylenically unsaturated monomer (manufactured by Sartomer Company, trade name: SR339) | 49.0 parts |
| SOLSPERSE 32000 (trade name, manufactured by Noveon Inc., dispersant) | 1.2 parts |
| IRGALITE BLUE GLVO (trade name, manufactured by Ciba Specialty Chemicals, pigment) | 3.0 parts |
| FIRSTCURE ST-1 (trade name, manufactured by ChemFirst Inc., polymerization inhibitor) | 0.05 part |
| LUCIRIN TPO (trade name, manufactured by BASF, photoinitiator): component (C) | 4.0 parts |
| IRGACURE 369: component (C) (trade name, manufactured by Ciba Specialty Chemicals, photoinitiator) | 0.5 part |
| 4-Phenylbenzophenone: component (C) (manufactured by Tokyo Chemical Industry Co., Ltd., photoinitiator) | 1.0 part |
| DAROCUR ITX: component (C) (trade name, manufactured by Ciba Specialty Chemicals, photoinitiator) | 1.0 part |
| BYK 307 (trade name, manufactured by BYK Chemie, defoamer) | 0.05 part |

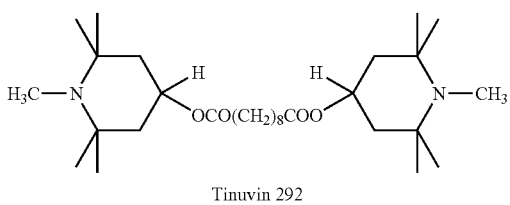

Tinuvin 292

The cyan color ink composition obtained in Comparative Example 3 was ejected on a sheet made of a polyvinyl chloride in the same manner as in Example 1, and cured. The printed matter by this ink composition was evaluated in the same manner as in Example 1. The results are shown in Table 1.

TABLE 1

|  | Exposure amount (mJ/cm²) | Curability | Adhesiveness | Flexibility | Ejection stability | Blocking resistance |
| --- | --- | --- | --- | --- | --- | --- |
| Example 1 | 400 | Good | 4B | B | A | A |
| Example 2 | 400 | Good | 5B | A | A | A |
| Example 3 | 400 | Good | 4B | B | A | A |
| Example 4 | 400 | Extremely slightly tacky | 4B | B | A | A-B |
| Example 5 | 400 | Extremely slightly tacky | 3B | B | A | A-B |
| Example 6 | 400 | Good | 4B | A | A | A |
| Example 7 | 400 | Good | 4B | A | A | A |
| Comparative Example 1 | 400 | Good | 3B | D | A | A |
| Comparative Example 2 | 400 | Tacky | 2B | B | B | C |
| Comparative Example 3 | 400 | Good | 3B | C | A | B-C |

As is apparent from Table 1, it is found that the ink compositions of Examples 1 to 7 each are cured with high sensitivity and are excellent in all evaluation items of curability of an image area, adhesiveness to a recording medium, flexibility, ejection stability and blocking resistance.

On the other hand, it is found that the ink composition of Comparative Example 1 which does not contain N-vinyllactam (A) is poor in flexibility of a cured film.

In Comparative Example 2 in which the ink composition of Comparative Example 2 does not contain the specific polymerizable compound (B), a surface of an image area after curing was tacky, and the ink composition was poor in adhesiveness, ejection stability and blocking resistance.

It is found that the ink composition of Comparative Example 3 which uses the comparative amine compound which does not have a double bond is poor in flexibility and blocking resistance of an image area after curing.

According the present invention, it is possible to provide an ink composition for ink jet recording which is highly sensitive to the irradiation with actinic radiation and with which an image excellent in curability can be formed. Further, according to the present invention, it is possible to provide an ink composition for ink jet recording, with which a cured image with high adhesion to the recording medium and high blocking resistance can be obtained and which is excellent in ejecting stability when used in an ink jet apparatus. Further, it is possible to provide an ink jet recording method in which the ink composition is used.

Hereinafter exemplary embodiments of the present invention will be listed. However, the invention is not limited to the following embodiments.

<1> An ink composition for ink jet recording, comprising:

(A) a N-vinyllactam, (B) a compound comprising a partial structure represented by the following formula (I) and a polymerizable unsaturated bond, and (C) a radical polymerization initiator,

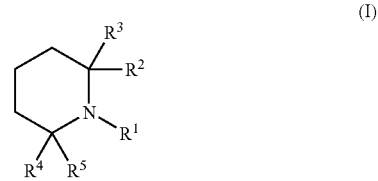

wherein in formula (I), $R^1$ represents a hydrogen atom or an alkyl group, and $R^2$ to $R^5$ each independently represent a methyl group or an ethyl group.

<2> The ink composition for ink jet recording of <1>, wherein a lactam ring of the N-vinyllactam is an epsilon-caprolactam ring.

<3> The ink composition for ink jet recording of <1>, wherein the N-vinyllactam is N-vinylpyrrolidone or N-vinylcaprolactam.

<4> The ink composition for ink jet recording of <1>, wherein the compound comprising a partial structure represented by formula (I) and a polymerizable unsaturated bond is represented by the following formula (II);

(II)

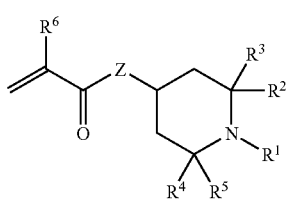

wherein $R^1$ represents a hydrogen atom or an alkyl group, $R^2$ to $R^5$ each independently represent a methyl group or an ethyl group, $R^6$ represents a methyl group or a hydrogen atom, and Z represents a divalent connecting group.

<5> The ink composition for inkjet recording of <4>, wherein Z in the formula (II) is an alkylene group having from 1 to 20 carbon atoms.

<6> The ink composition for ink jet recording of <5>, wherein Z in the formula (II) is an alkylene group having one or more divalent groups selected from the group consisting of —CO—, —O—, —S— and —NR$^7$— in a methylene chain, and $R^7$ represents a hydrogen atom or an alkyl group.

<7> A method for ink jet recording, comprising:
(i-1) ejecting the ink composition for ink jet recording of <1> onto a recording medium, and
(i-2) curing the ejected ink composition for ink jet recording by irradiation with actinic radiation.

<8> The method for ink jet recording of <7>, wherein a lactam ring of the N-vinyllactam is an epsilon-caprolactam ring.

<9> The method for ink jet recording of <7>, wherein the N-vinyllactam is N-vinylpyrrolidone or N-vinylcaprolactam.

<10> The method for ink jet recording as claimed in claim <7>, wherein the compound comprising a partial structure represented by formula (I) and a polymerizable unsaturated bond is represented by the following formula (II);

(II)

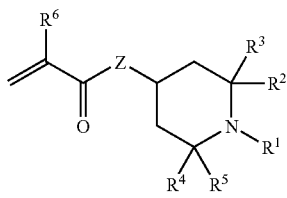

wherein $R^1$ represents a hydrogen atom or an alkyl group, $R^2$ to $R^5$ each independently represent a methyl group or an ethyl group, $R^6$ represents a methyl group or a hydrogen atom, and Z represents a divalent connecting group.

All publication, patent applications, and technical standards mentioned in this specification are herein incorporated by reference to the same extent as if each individual publication, patent application, or technical standard was specifically and individually indicated to be incorporated by reference.

What is claimed is:

1. An ink composition for ink jet recording, comprising:
(A) a N-vinyllactam,
(B) a compound comprising a partial structure represented by the following formula (I) and a polymerizable unsaturated bond, and
(C) a radical polymerization initiator, (I)

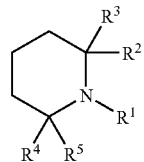

wherein in formula (I), $R^1$ represents a hydrogen atom or an alkyl group, and $R^2$ to $R^5$ each independently represent a methyl group or an ethyl group, wherein the N-vinyllactam is N-vinylcaprolactam, and the compound comprising a partial structure represented by formula (I) and a polymerizable unsaturated bond is represented by the following formula (II):

(II)

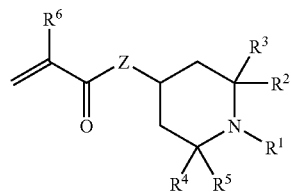

wherein $R^1$ represents a hydrogen atom or an alkyl group, $R^2$ to $R^5$ each independently represents a methyl group or an ethyl group, $R^6$ represents a methyl group or a hydrogen atom, and Z represents an alkylene group having from 1 to 20 carbon atoms or an alkylene group having from 1 to 20 carbon atoms and one or more divalent groups selected from the group consisting of —CO, —O—, —S— and —NR$^7$— in a methylene chain, and $R^7$ represents a hydrogen atom or an alkyl group.

2. The ink composition for ink jet recording of claim 1, wherein a lactam ring of the N-vinyllactam is an epsilon-caprolactam ring.

3. The ink composition for ink jet recording of claim 1, wherein Z in the formula (II) is an alkylene group having from 1 to 20 carbon atoms.

4. The ink composition for ink jet recording of claim 1, wherein Z in the formula (II) is an alkylene group having one or more divalent groups selected from the group consisting of —CO, —O—, —S— and —NR$^7$— in a methylene chain, and $R^7$ represents a hydrogen atom or an alkyl group.

5. The ink composition for ink jet recording of claim 1, wherein (c) the radical polymerization initiator is (a) an aromatic ketone and/or (b) an acylphosphine oxide compound.

6. The ink composition for ink jet recording of claim 1, wherein (c) the radical polymerization initiator is (b) an acylphosphine oxide compound.

7. The ink composition for ink jet recording to claim 1, further comprising a colorant which comprises pigments dispersed with a dispersant.

8. A method for ink jet recording, comprising:
(i-1) ejecting the ink composition for ink jet recording of claim 1 onto a recording medium, and
(i-2) curing the ejected ink composition for ink jet recording by irradiation with actinic radiation.

9. The method for ink jet recording of claim 8, wherein a lactam ring of the N-vinyllactam is an epsilon-caprolactam ring.

* * * * *